(12) United States Patent
McCarthy et al.

(10) Patent No.: US 7,558,758 B2
(45) Date of Patent: Jul. 7, 2009

(54) BUSINESS EVENT TRIGGERED, POLICY-DRIVEN PAYMENT MANAGEMENT

(75) Inventors: Julia K. McCarthy, Weaverville, NC (US); George H. Moryadas, Durham, NC (US); Mark E. Peters, Chapel Hill, NC (US); Andrea J. Watkins, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 10/180,875

(22) Filed: Jun. 26, 2002

(65) Prior Publication Data
US 2004/0002918 A1   Jan. 1, 2004

(51) Int. Cl.
*G06F 17/60* (2006.01)
(52) U.S. Cl. ...................................... 705/40
(58) Field of Classification Search ............. 705/40, 705/26
See application file for complete search history.

(56) References Cited

U.S. PATENT DOCUMENTS

| | | | | |
|---|---|---|---|---|
| 5,630,127 | A * | 5/1997 | Moore et al. | 707/103 R |
| 5,893,080 | A * | 4/1999 | McGurl et al. | 705/40 |
| 6,038,548 | A | 3/2000 | Kamil | 705/35 |
| 6,999,943 | B1 * | 2/2006 | Johnson et al. | 705/39 |
| 7,333,953 | B1 * | 2/2008 | Banaugh et al. | 705/40 |
| 2002/0016769 | A1 * | 2/2002 | Barbara et al. | 705/40 |
| 2002/0111886 | A1 * | 8/2002 | Chenevich et al. | 705/30 |

OTHER PUBLICATIONS http://www-3.ibm.com/software/webservers/commerce/payment/moreinfo.html.
http://www-106.ibm.com/developerworks/ibm/library/i-extreme15/.
http://www-3.ibm.com/software/webservers/commerce/payment/docs/PMBrochure.pdf.
http://www-106.ibm.com/developerworks/ibm/library/i-money.
Http://www-3.ibm.com/software/webservers/commerce/payment/docs/paymgr221prog.pdf.
IBM WebSphere Commerce Payments for Multiplatforms, Cassette Kit Programmer's Guide, Version 3.1, pp. 1-25 and 103-104, and 188-190.
"Designing a generic payment service", IBM Systems Journal, vol. 37, No. 1 pp. 72-88, 1998 http://www.research.ibm.com/journal/sj/371/abadpeiro.html.

(Continued)

*Primary Examiner*—James Kramer
*Assistant Examiner*—Jared W. Newton
(74) *Attorney, Agent, or Firm*—Marcia L. Doubet

(57) ABSTRACT

Techniques are disclosed for using business events as triggers to drive payment processing for electronic commerce. As the business logic of a merchant's e-commerce software application reaches various stages that impact payment considerations, it issues a corresponding event notification. According to preferred embodiments, these event notifications are processed by a policy engine, which locates policy information or rules previously configured for that event. Actions are then carried out, based on the configured policy. The merchant e-commerce application is therefore shielded from the details of the underlying payment processing. New payment types can be provided, and existing payment types can be modified if necessary, by adding/modifying policies; the merchant's e-commerce application does not need to change. This event-driven model allows application developers to focus on creating software for the merchant's key business requirements, and makes it easier to maintain the software.

4 Claims, 11 Drawing Sheets

OTHER PUBLICATIONS

"Eco System: An Internet commerce architecture" Computer, vol. 30, No. 5, pp. 48-55, May 1997.

"WebSphere Commerce payment processing", IBM Corporation, printed from http://www-3.ibm.com/software/webservers/commerce/payment/moreinfo.html on May 25, 2002, pp. 1-2.

Naick, Indran and Gupta, Reema, "The Go-ForIt Chronicles: Memoirs of eXtreme DragonSlayers, Part 15", IBM Corporation, Feb. 2002, printed from http://www-106.ibm.com/developerworks/ibm/library/i-extreme15/ on May 25, 2002, pp. 1-9.

"WebSphere Payment Manager. Empower your merchants with Internet payments.", IBM Corporation, 1999, printed from http://www-3.ibm.com/software/webservers/commerce/payments/docs/PMBrochure.pdf, pp. 1-8.

Naick, Indran and Gupta, Reema, "Show me the money! Electronic payment processing for Web businesses", IBM Corporation, Feb. 2002, printed from http://www-106.ibm.com/developerworks/ibm/library/i-money/ on May 26, 2002, pp. 1-11.

"IBM WebSphere Payment Manager for Multiplatforms, Programmer's Guide and Reference, Version 2.2.1", IBM Corporation, Jun. 2001, pp. 3-12 and 55-60.

Peiro, J.L. Abad et al., "Designing a generic payment service", IBM Systems Journal, vol. 37, No. 1, pp. 72-88, 1998, printed from http://www.research.ibm.com/journals/sj/371/abadpeiro.html on Feb. 12, 2002.

Tenenbaum, Jay M. et al., "Eco System: An Internet Commerce Architecture", Computer, vol. 30, No. 5, pp. 48-55, May 1997.

* cited by examiner

FIG. 2

260 Desired State = Payment Approved

| Start State | Requested Amount == Current Payment Amount (205) | Requested Amount > Current Payment Amount (210) | Requested Amount < Current Payment Amount (215) |
|---|---|---|---|
| Payment Approved (220) | --- | Modify Payment Approval (RA) | Modify Payment Approval (RA) |
| Payment Declined (225) | Approve Payment (RA) | Approve Payment (RA) | Approve Payment (RA) |
| Payment Deposited (230) | --- | --- | --- |
| Payment Void (235) | / | Approve Payment (RA) | / |
| Payment Approval has Expired (240) | Modify Payment Approval (RA) | Modify Payment Approval (RA) | Modify Payment Approval (RA) |
| Payment is Pending (245) | R | R | R |
| Null (250) | / | Create Payment (RA); Approve Payment (RA); | / |

| Start State | Requested Amount == Current Payment Amount | Requested Amount > Current Payment Amount | Requested Amount < Current Payment Amount |
|---|---|---|---|
| Payment Approved | -- | Modify Payment Approval (RA) | Modify Payment Approval (RA) |
| Payment Declined | Approve Payment (RA) | Approve Payment (RA) | Approve Payment (RA) |
| Payment Deposited | -- | -- | -- |
| Payment Void | / | Approve Payment (RA) | / |
| Payment Approval has Expired | Modify Payment Approval (RA) | Modify Payment Approval (RA) | Modify Payment Approval (RA) |
| Payment is Pending | R | R | R |
| Null | / | Create Payment (RA); Approve Payment (RA); | / |

Desired State = Payment Approved

FIG. 4

| Start State | Requested Amount == Current Payment Amount (405) | Requested Amount > Current Payment Amount (410) | Requested Amount < Current Payment Amount (415) |
|---|---|---|---|
| 420 Payment Approved | Deposit Payment (RA) | Modify Payment Approval (RA); Deposit Payment (RA) | Modify Payment Approval (RA); Deposit Payment (RA) |
| 425 Payment Declined | Approve Payment (RA); Deposit Payment (RA) | Approve Payment (RA); Deposit Payment (RA) | Approve Payment (RA); Deposit Payment (RA) |
| 430 Payment Deposited | — | — | — |
| 435 Payment Void | / | Approve Payment (RA); Deposit Payment (RA) | / |
| 440 Payment Approval has Expired | Modify Payment Approval (RA); Deposit Payment (RA) | Modify Payment Approval (RA); Deposit Payment (RA) | Modify Payment Approval (RA); Deposit Payment (RA) |
| 445 Payment is Pending | R | R | R |
| 450 Null | / | Create Payment (RA); Approve Payment (RA); Deposit Payment (RA) | / |

Desired State = Payment Deposited

| Start State | Requested Amount == Current Payment Amount | Requested Amount > Current Payment Amount | Requested Amount < Current Payment Amount |
|---|---|---|---|
| any | --- | --- | --- |

Desired State = Null

660 Desired State = Payment Deposited

| 600 | Start State | 605 Requested Amount == Current Payment Amount | 610 Requested Amount > Current Payment Amount | 615 Requested Amount < Current Payment Amount |
|---|---|---|---|---|
| 620 | Payment Approved | Deposit Payment (RA) | Modify Payment Approval (RA); Deposit Payment (RA) | Modify Payment Approval (RA); Deposit Payment (RA) |
| 625 | Payment Declined | Approve Payment (RA); Deposit Payment (RA) | Approve Payment (RA); Deposit Payment (RA) | Approve Payment (RA); Deposit Payment (RA) |
| 630 | Payment Deposited | --- | Create Payment (RA - CPA); Approve Payment (RA - CPA); Deposit Payment (RA - CPA) | E |
| 635 | Payment Void | / | Approve Payment (RA); Deposit Payment (RA) | / |
| 640 | Payment Approval has Expired | / | / | / |
| 645 | Payment is Pending | R | R | R |
| 650 | Null | / | Create Payment (RA); Approve Payment (RA); Deposit Payment (RA) | / |

FIG. 7

| Start State | Requested Amount == Current Payment Amount (705) | Requested Amount > Current Payment Amount (710) | Requested Amount < Current Payment Amount (715) |
|---|---|---|---|
| Payment Approved (720) | Deposit Payment (RA) | Modify Payment Approval (RA); Deposit Payment (RA) | Modify Payment Approval (RA); Deposit Payment (RA) |
| Payment Declined (725) | Approve Payment (RA); Deposit Payment (RA) | Approve Payment (RA); Deposit Payment (RA) | Approve Payment (RA); Deposit Payment (RA) |
| Payment Deposited (730) | --- | Create Payment (RA - CPA); Approve Payment (RA - CPA); Deposit Payment (RA - CPA) | E |
| Payment Void (735) | / | Approve Payment (RA); Deposit Payment (RA) | / |
| Payment Approval has Expired (740) | / | / | / |
| Payment is Pending (745) | R | R | R |
| Null (750) | / | Create Payment (RA); Approve Payment (RA); Deposit Payment (RA) | / |

700

Desired State = Payment Deposited

BUSINESS EVENT TRIGGERED, POLICY-DRIVEN PAYMENT MANAGEMENT

BACKGROUND OF THE INVENTION

1. Field of the Invention

The present invention relates to automated payment processing, and deals more particularly with methods, systems, and computer program products for using business events and configured policy to carry out payment processing for a variety of payment methods.

2. Description of the Related Art

The popularity of electronic commerce ("e-commerce"), or buying goods and services over a network such as the Internet, continues to increase at a tremendous pace. Estimates are consumer electronic commerce transactions will grow from under $10 billion in 1998 to over $100 billion by 2003.

A particular merchant may participate in electronic commerce only with consumers (i.e., in business-to-consumer or "B2C" transactions), or only with other businesses (i.e., in business-to-business or "B2B" transactions). Or, a merchant may participate in electronic commerce for both B2C and B2B transactions.

Getting paid for their goods and services is essential to the merchants involved in electronic commerce, and customers expect the payment process to be easy-to-use, flexible, and reliable. In business-to-consumer transactions, in particular, customers expect merchants to offer the same wide range of payment choices that are found in conventional brick-and-mortar stores and that are offered for mail-order or telephone-order sales.

Many different payment choices are possible for electronic commerce transactions. Credit cards are one popular payment method or "payment instrument". Additional choices include debit cards, stored-value cards, gift certificate acceptance, loyalty systems, automated clearing house ("ACH") transactions, wire transfer, and electronic fluids transfer. These payment methods are well known, and have been used for many years in conventional buyer/seller transactions. Several newer payment methods have been developed in recent years, specifically for electronic commerce. These include electronic checks, electronic cash, and electronic wallets (also referred to as "e-checks", "e-cash", and "e-wallets", respectively).

E-check payments are designed to mimic traditional paper check payments. E-cash similarly, is designed to mimic payment by cash. Typically, e-check payments are carried out by transferring funds from a user's bank account in response to the user making an e-check payment request. For e-cash transactions, a user transfers money from a bank account (or card account) into a separate electronic account, and then makes payments against the funds represented by this account. E-wallets "hold" information of the type held by a real wallet, including credit card numbers, expiration dates, billing addresses, and other types of account numbers and information. Using an e-wallet makes the payment process simpler and faster for the user, as the wallet software automatically performs certain payment steps. For example, rather than requiring the user to type in a rather long credit card number and its expiration date when paying with a credit card, the e-wallet software supplies this information automatically, once the user selects which credit card to use for a particular transaction.

Developing software that supports a selection of payment methods for e-commerce is a very complex undertaking, as the logic for processing each payment method may be influenced by a variety of factors, and different payment methods typically each have their own nuances that must be accommodated. For example, a billing address is typically required when processing a credit card payment, but not when processing an ACH transaction. As another example, even though credit cards and gift certificates may both use expiration dates, the meaning of the date is somewhat different for each payment method. Furthermore, each of the payment methods may be offered by a number of different providers, and different providers may have different procedures that must be followed. The payment processing can also be affected by the type of item being ordered. For example, for purchases of services or intangible goods (also known as "soft goods"), the timing at which the buyer's credit card can be charged may be different than if tangible goods (also known as "hard goods") are being sold. In addition, different procedures may apply to a particular payment method depending on the laws and regulations of a country or region in which a purchase is made. For example, in the United States, a credit card cannot be charged for hard goods until those goods have shipped to the buyer, whereas in some other countries, this is not the case.

Accommodating the wide range of pertinent factors involved in payment processing for multiple payment methods within a merchant's e-commerce software tends to make that software overly complex and difficult to maintain, and diverts the developer's attention from addressing the merchant's core business needs.

Accordingly, what is needed are improved techniques for processing electronic commerce payments (or automated payment processing used for other forms of buyer/seller transactions).

SUMMARY OF THE INVENTION

An object of the present invention is to provide improved techniques for carrying out electronic commerce payment processing.

Another object of the present invention is to provide these improved techniques by using configured policy that is driven by business events.

Another object of the present invention to provide improved automated payment processing.

It is a further object of the present invention to provide improved techniques for delivering merchant-neutral payment software functionality.

Yet another object of the present invention is to enable merchant electronic commerce software to be less complex and more independent of nuances associated with various payment instruments.

Still another object of the present invention is to enable merchant electronic commerce software to be created by a third party and offered for sale to a large variety of merchants with varying payment needs in a way that allows new payment types to be incorporated without requiring new versions of the commerce software to be delivered.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides systems, methods, and computer program products for policy-driven payment processing. In one aspect, an embodiment of the present invention comprises processing payments by: receiving a business event notification signifying that a payment processing unit has reached a particular business stage; programmatically determining a payment-processing policy to be applied to this payment processing unit; and programmatically determining zero or more actions to be carried out for this payment processing unit, according to the programmatically-determined policy and a current state of the payment processing unit. This technique may further comprise carrying out the programmatically-determined actions, and may also further comprise revising the current state of the payment processing unit to reflect a result of the actions carried out.

More than one payment transaction, and more than one payment method, may be applied to a particular payment processing unit. In this embodiment, each of the payment transactions may represent a different payment method. The actions carried out for the payment processing unit preferably move payment for the payment processing unit toward completion.

A plurality of payment-processing policies are preferably provided, and the selected policy is selected from this plurality.

In another aspect, an embodiment of the present invention comprises providing a policy-driven payment processing system by: providing a plurality of payment-processing policies, each of the policies specifying how payment transactions for a payment method should be carried out; selecting, by a merchant that will use the policy-driven payment processing system, one or more of the provided policies; receiving business event notifications representing payment processing units; programmatically determining the selected policy that corresponds to each of the payment processing units represented by the received notifications; and applying each of the programmatically-determined policies to the corresponding payment processing units, thereby moving payment for the payment processing unit toward completion. This embodiment may further comprise overriding the programmatically-determined selection of policy upon receipt of a first of the business event notifications that represents a payment processing unit, thereby selecting a different policy to be used in the application of the policy. The overriding may consider one or more factors such as: an amount of the payment processing unit; and an identification of a customer for whom the payment processing unit is to be processed; and so forth.

The present invention will now be described with reference to the following drawings, in which like reference numbers denote the same element throughout.

BRIEF DESCRIPTION OF THE DRAWINGS

FIGS. 2-4 provide tables representing a first sample policy that is used to illustrate operation of preferred embodiments of the present invention, and FIGS. 5-7 provide tables representing a second sample policy;

DESCRIPTION OF PREFERRED EMBODIMENTS

Figure 1:
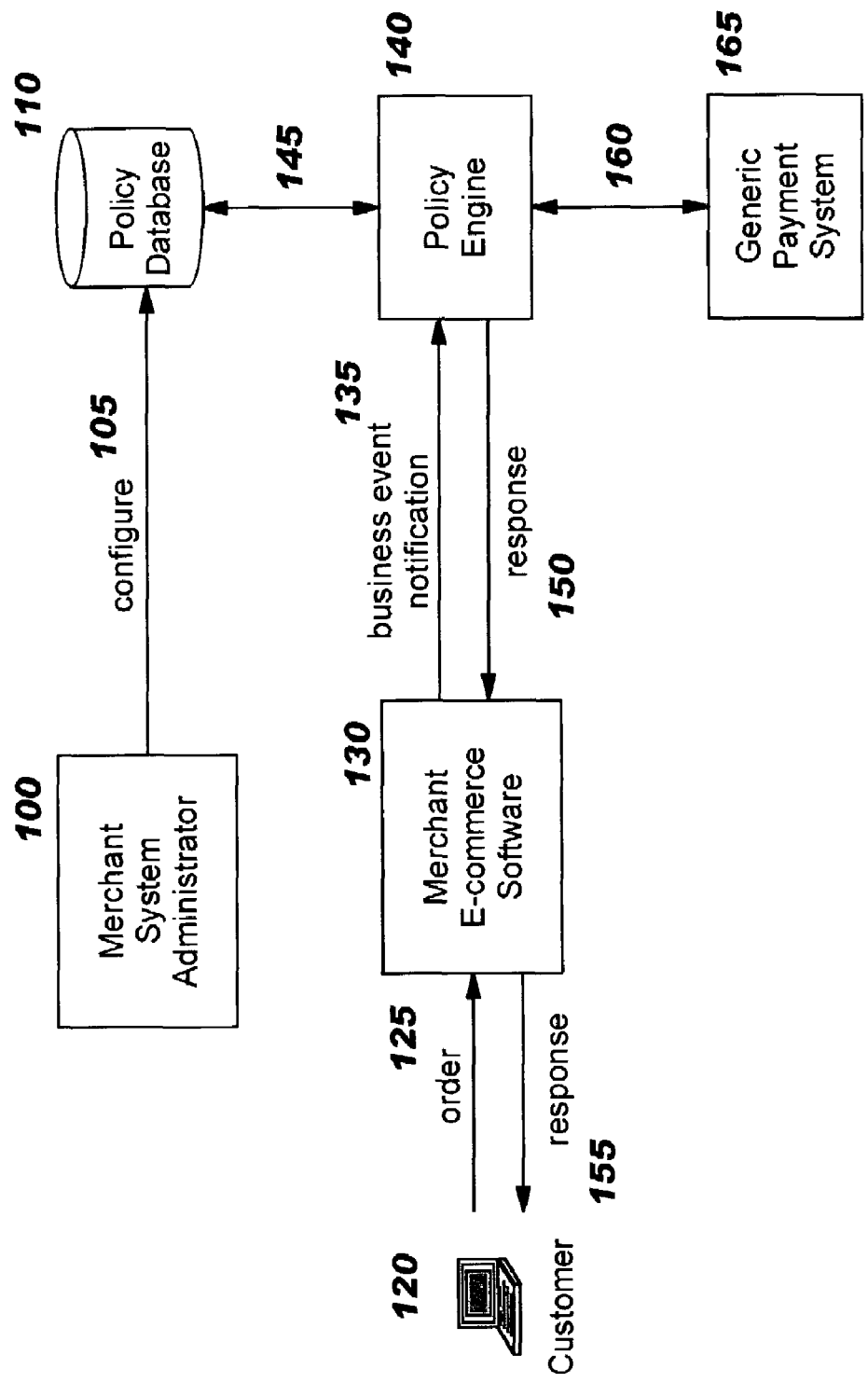
FIG. 1 illustrates, at a high level, how an embodiment of the present invention operates to process a customer's payment.

To be competitive, online merchants' e-commerce software must typically offer multiple payment methods to their customers; otherwise, with a few clicks of their mouse, the customers may find a different merchant. In addition, this e-commerce software must keep pace with newly-developed payment methods. However, as discussed above, writing merchant e-commerce software applications so that they address the wide variety of factors that are pertinent to the different payment methods not only significantly increases the complexity of the software (which in turn leads to increased development and support costs), it also distracts the software developer's attention from the merchant's core business issues. The complexity of this task increases exponentially when the merchant software is being created as a product to be marketed to a wide variety of merchants, where the unknown and changing payment needs of future customers must also be met.

Suppose, for example, that a customer places an order for $300 worth of goods from an online merchant. If the customer chooses to pay with a credit card, then the merchant's e-commerce software may request that checks be performed to ensure that this customer has an account with that credit card company, that the provided account number is valid, and that the customer has $300 in credit available on that account. The credit card company, in response to receiving the request, typically places a reservation for the $300 amount on the customer's account but does not yet charge the customer. The actual charge, and the deposit of the $300 into the merchant's account, is not typically processed until notification by the merchant once the goods have shipped. On the other hand, if the customer chooses to pay using an ACH transaction, then no reservation of funds is required (or possible), and thus the funds are typically deposited prior to shipping the goods. (In fact, the deposit of the $300 may be a prerequisite to shipping the goods.) The policy engine disclosed herein allows the merchant to signal that the goods are about to be shipped, and the policy engine then uses the configured policy to decide what that means in a particular instance.

This scenario is representative of the different processing that must be performed based on the type of payment instrument being used. And as mentioned earlier, other factors (such as the laws governing a particular payment) may also affect how payment transactions are carried out. When an order ships in more than one release, or the customer cancels part of an existing order for which a payment reservation has already been made, or adds items to an order after it has been placed, or changes payment information, or uses more than one payment instrument for a single order, the complexity of the payment processing may increase significantly.

An example of this more complex processing, suppose that a customer orders $800 worth of products from a merchant, and that a reservation for this amount is placed on his credit card account. Before the goods are shipped, the customer changes his mind and cancels items costing $200 from his order. The merchant then has a reservation for too much money, and must either cancel the existing reservation and submit a new reservation for $600 or request reduction of the existing reservation by $200; fees assessed by the credit card company may influence how a particular merchant wishes to proceed in this scenario. In a country where the merchant is allowed to collect the finds in advance of shipping the goods, the customer's cancellation means that a refund of already-deposited funds must be generated. Similarly, processing for refunds can vary widely, and typically depends on the type of payment instrument used for the original payment. For example, if a gift certificate was used, then the merchant may want to issue a new gift certificate; if a credit card was used, then the refund typically must be issued to that credit card account (unless the account is closed); and so forth.

The present invention defines novel techniques for payment processing, whereby business events are used as triggers to drive the payment process. As the business logic of the merchant's e-commerce software application reaches various stages that impact payment considerations, it issues a corresponding event notification. According to preferred embodiments, these notifications are received and processed by a policy engine, which locates policy information or rules previously configured by the merchant for that event. Payment actions are then carried out, based on the configured policy. (Optionally, policies may specify actions that do not specifically pertain to making payments, such as actions that may be used for coordinating, synchronizing, or management purposes.) The merchant e-commerce application is therefore shielded from the details of the underlying payment processing. New payment types can be provided, and the processing for existing payment types can be modified if necessary, by adding/modifying policies; the merchant's e-commerce application does not need to change. This business-event-driven model allows the merchant's application developers to focus on creating software for the merchant's key business requirements.

It should be noted that while preferred embodiments of the present invention are described as interacting with merchant e-commerce software applications, the techniques disclosed herein may also be used advantageously for automated processing of payments in more traditional environments, such as mail-order or telephone-order sales. Thus, the e-commerce environment is described for purposes of illustration but not of limitation. Furthermore, the techniques disclosed herein may be applied to payment processing needs other than payment for orders. Examples include payment of bills and payment of fees, including recurring payments therefor.

In preferred embodiments, payment-method-specific policies are pre-supplied that are adapted to responding to a number of familiar business events. Exemplary order-processing business events, and sample policies for those business events, are described herein. The exemplary order-processing business events are referred to herein as "order capture", "release to fulfillment", and "fulfillment". As used herein, the term "order capture" represents the event of obtaining information about a customer's payment, the term "release to fulfillment" represents the event of preparing to ship goods (or to provide services) to the customer, and the term "fulfillment" represents the event of having shipped goods (or provided services) to the customer. (For ease of reference, subsequent discussions refer only to goods and shipment of goods; however, this is intended to encompass the provision of services. The point at which a service is considered to have been "delivered" or provided to a customer may depend on the type of service. It will be obvious to one of ordinary skill in the art how the discussions of shipment of goods may be adapted to the provision of services.) Different and/or additional business events may also be supported by an implementation of the present invention. For example, the inventive techniques disclosed herein may be used for processing payments for other types of bills, payments of various types of fees, and so forth. (The term "payment processing unit" may be used generally to describe the business transactions for which payments are being processed, where the payment processing unit corresponds to the order, bill, fee, etc.) In general, the order capture business event signifies the point in processing when information on an order is recorded, and payment instruments are validated. The release to fulfillment business event signifies that suitable payment activities are completed that are required to reserve payment against a group of order items that are ready to be included in suitable releases. The fulfillment business event signifies the point in processing when it is appropriate to deal with payment activities that may be necessary after goods have been sent out from a fulfillment center for each release. (Note that the actual payment actions to be carried out and the input states and desired next states associated with validating, reserving, and finalizing payment are completely specified by the policy, according to preferred embodiments of the present invention.)

Use of one or more of the pre-supplied policies may be configured by a particular merchant in order to select the payment-processing behavior associated with that policy. Optionally, an implementation of the present invention may be adapted to allow merchants to define additional policies and/or to modify how pre-supplied policies operate, once the teachings disclosed herein are known, and implementations providing this optional capability are within the scope of the present invention. For example, a merchant might copy a pre-supplied policy and then adjust that policy to meet its needs; the adjusted policy can then be configured as active for this merchant.

According to preferred embodiments, each payment-method-specific policy addresses each of the business events (i.e., responds to corresponding event notifications). A particular payment method may have more than one policy. For example, a policy may be provided for one brand of credit card, while a different policy is provided for a different credit card brand. Or, multiple policies might be provided for a payment method such as gift certificates, in order to define different processing approaches for that payment method. More flexibility can therefore be provided to merchants, who have only to select the policy that meets their needs for a particular payment method.

Referring now to FIG. 1, a high-level illustration is provided showing how an embodiment of the present invention operates to process a customer's payment. According to preferred embodiments, a merchant first selects which policies it wishes to use. This is represented in FIG. 1 by a merchant's system administrator 100 (or other personnel or automated processing) using a configuration interface 105 to select one or more policies 110 from a policy database or other repository. (Note that preferred embodiments are described herein in terms of a multi-merchant system, where individual merchants then select the policies they wish to use. Alternatively, the present invention may be used advantageously in a single-merchant system. In this case, the policies 110 may be limited to those which are deemed useful by this merchant, and the configuration process for that merchant comprises selecting which policy to apply to which payment option. It will be obvious to one of skill in the art how the processing described herein applies to the deviant case of supporting a single merchant.)

When in operation, the policy-driven payment processing is invoked when a customer 120 transmits an order 125 to a merchant's e-commerce software 130, and while processing the payment for this order, the merchant's software 130 generates a business event notification 135. This business event notification 135 is received by the policy engine 140, which then accesses 145 the appropriate policy to determine which action(s) should be carried out for this point in the processing of the payment. In preferred embodiments, the appropriate policy is determined by: which merchant generated the event notification; the type of payment instrument being used for this payment; and which policy this merchant selected for processing payments that use this payment instrument. Which action(s) is/are appropriate for a particular invocation of that policy is then determined by a number of factors, including: the business event represented by the event notification; and the current state of this particular payment, including values of one or more variables which pertain to the payment.

Upon determining one or more actions specified by the policy, the policy engine 140 calls 160 a generic payment system 165 to perform the specified actions. During the generic payment system's processing, it carries out the actions. For example, the generic payment system creates actual payment messages, and interacts with back-end components such as credit card companies and acquiring banks to perform credit checks, transfer funds, and so forth. (A detailed discussion of how the generic payment system operates is beyond the scope of the present invention.)

After triggering the specified payment actions, the policy engine 140 may return a response 150 to the calling merchant software 130, which in turn may return a response 155 to the client software operating on customer 120's computing device.

As the payment processing continues, one or more subsequent business event notifications 135 may be generated by the merchant software 130. These subsequent business event notifications drive the progression of the payment processing (and may be, but are not necessarily, in response to end-user interactions with customer 120).

The policy-driven payment processing of the present invention is preferably implemented as a layer of software that maps business events to payment actions, based on configured policy. The merchant's e-commerce software can then be written with reference to selected business events, and does not need to account for the details of how different payment types are affected by factors such as by the country or geography whose laws govern the payment, the different types of risks that may be inherent in different types of payment instruments, and so forth. Instead, those details are accounted for by selecting appropriate policies, based on how the policy impacts the processing for particular payment instruments.

Preferred embodiments of the present invention carry out policy-driven payment processing using a state transitions model, whereby a payment progresses toward completion based on the applicable policy's definition for the payment's current state, values of pertinent variables, and the particular business event for which a notification is generated. The application programming interface ("API") to the policy engine therefore supports a plurality of payment-related events, and the merchant's e-commerce software generates notifications for those events at appropriate points during processing.

As a configured policy operates to direct the payment processing software, a customer's payment moves from one payment processing state to another. According to preferred embodiments, the payment processing states are set by the generic payment system as it processes a payment transaction.

The policy inherently deals with the risk models of various payment instruments. For example, the funds to pay for an order may be captured earlier or later in the payment cycle, in accordance with the policy selected by the merchant. The type of action to be taken during the various phases can also be chosen by selecting a particular policy, and these actions may vary from one payment instrument to another or among policies for a single payment instrument.

As stated earlier, preferred embodiments are described herein, by way of illustration, in terms of the following business events: order capture, release to fulfillment, and fulfillment. Several representative payment processing actions and payment processing states are also used herein to describe operation of preferred embodiments, by way of illustration. These representative actions are: "create payment", "approve payment", "modify payment approval", "deposit payment", and "reverse payment deposit". The representative payment states are: "payment approved", "payment declined", "payment deposited", "payment void", "payment approval has expired", "payment is pending", and "null". (A "null" payment state indicates that a payment object has not yet been created.)

As the generic payment system processes the actions called for by a policy, the current payment state may change. For example, a payment approval might expire or a pending payment might complete, according to the generic payment system's processing. The policy accounts for these state changes upon receiving the next business event notification. The policy engine may learn the current state by querying the generic payment system, by accessing a payment object which stores the current state, etc.

According to preferred embodiments, a "validation" phase is carried out responsive to receiving an order capture event notification, a "reservation" phase is carried out responsive to receiving a release to fulfillment event notification, and a "finalization" phase is carried out responsive to receiving a fulfillment event notification. Individual policies control what actions are taken in each of these phases, as will now be described with reference to the example policies in FIGS. 2-4 and 5-7. In the state transitions model used in preferred embodiments, a separate table or set of transitions is defined for each of these three phases, and a policy comprises one of these state transition tables for each of the phases. (Tables are used for illustrative purposes; other ways of expressing this information are also within the scope of the present invention.)

The first example policy, which is represented in tabular form by FIGS. 2-4, is representative of credit card payment processing in North America. This policy calls for authorization of a customer's credit card to be performed immediately upon receiving the order capture event notification. According to this policy, the authorization must complete successfully before goods are shipped, and the payment will be captured only after the goods ship. The manner in which this information is represented in the tables of FIGS. 2-4 will now be described.

Column headings in the policy tables of FIGS. 2-4 (as well as FIGS. 5-7) refer to a "requested amount" and a "current payment amount". At each phase of processing, the policy system is asked to process payments for a certain amount. Payment actions required according to cells in the policy table may perform further processing of payments already in progress. For example, if the action required in the finalization phase is the capture of a credit card, that capture is acting on a previous authorization. (The term "capture" in this case refers to a deposit action and the term "authorization" refers to an approval.) The amount of the requested deposit will typically be the same as the amount of the approval, but in some cases the amounts will be different. In addition, a change of payment information or the addition or removal of order items might cause a particular phase of processing to be repeated. In this case, generic payment objects may already exist for this order, for amounts that are no longer accurate. Thus, the discussions herein use the term "requested amount" to refer to the amount of payment being processed in the current phase, and the term "current payment amount" refers to the amount of an existing payment object (if any). According to preferred embodiments, the policy encodes actions required to deal with all such changes introduced into the system.

FIG. 2 corresponds to the validation phase, and the specifications in this table are evaluated when the validation policy (i.e, the validation phase of a configured policy) is processed in response to receiving an order capture event notification. (See the description of Block 830 of FIG. 8, below, which calls for applying validation policy during the logic of the flow chart that handles order capture event notifications.) For the transitions represented by this validation policy, the desired payment state is "payment approved", as noted at 260. The desired payment state named for each phase of a policy is the generic payment state that must be reached to successfully complete payment processing for the current phase. Each set of actions in a policy table thus describes a preferred way of achieving the desired state, given the starting state and the relative change in payment amount.

The processing in FIGS. 2-7 will be described in terms of seven different entry states, each of which corresponds to a row of the transition tables, and three different conditions, each of which corresponds to a column of these tables. The seven entry states were discussed previously as "representative payment states".

The payment's current state upon entry may be "payment approved", corresponding to the first row 220 of table 200. If the payment is already approved, and the approval amount matches the amount for a particular release (i.e., shipment), then there is no further validation required at this point. This is represented in table 200 by the "---" notation in column 205. The payment's current state therefore remains set to "payment approved". Columns 210 and 215 account for situations in which the requested amount (i.e., the amount of the payment being validated for this request) is greater than or less than, respectively, the current payment amount (i.e., the amount of the approval). Thus, when the payment is already approved (row 220), but the order amount to be validated is greater than the amount already approved (column 210), then this policy specifies that a "modify payment approval" action will be triggered, using as its amount the amount of the payment for this validation (i.e., the requested amount, shown in the table as "RA"). Similarly, if the amount to be validated is less than the amount of the approval (column 215), this policy specifies that the modify payment approval action is to be triggered to replace the already-approved payment with an approval for the amount being validated. Assuming that the modify payment approval action completes successfully, the payment's current state remains set to "payment approved". (Or, one of the other states may be used, as determined by the generic payment system software as it carries out the modify payment approval action.)

Contrast the credit card processing called for by the policy in table 200 of FIG. 2 to the processing specified in table 500 of FIG. 5. Table 500, along with tables 600 and 700 of FIGS. 6 and 7, represent a second example policy. This policy might be selected for processing ACH transactions in North America, where the governing laws allow ACH transactions to complete before goods are shipped. Accordingly, this policy calls for the deposit of funds to be completed during the reservation phase, rather than waiting until the finalization phase.

Table 500 of FIG. 5 shows that, regardless of the payment's current state when an order capture event notification is received for this policy, no processing is required in the validation phase. See row 520. Instead, the current state transitions to a "null" state, as shown at 530 (and the payment will then be processed further during the reservation phase, upon receiving a release to fulfillment event notification).

Returning to the discussion of the credit card policy in table 200, and how it controls processing in the validation phase, suppose that the payment's current state upon entry is "payment declined". For example, a payment authorization process may have been attempted previously, when the customer did not have sufficient available credit for this order. This state corresponds to row 225. For this case, all three columns of table 200 indicate that the appropriate action under these circumstances is to trigger an "approve payment" action, using as its amount the amount of the validation request (shown in the table as "RA"). Assuming that the approve payment action completes successfully, the payment's current state is changed to "payment approved".

Alternatively, the payment's current state upon entering the validation processing might be "payment deposited". This state corresponds to row 230. When the payment is already deposited, nothing else is required in the validation phase, and thus all three columns of table 200 indicate that no action is required before transitioning to the "payment approved" state.

The payment's current state upon entering the validation processing may be "payment void", represented by row 235. "Payment void" is used, in preferred embodiments, when a payment was previously approved but was subsequently reversed. If the amount being validated is greater than the amount that was found to be void (column 210), then the policy specifies that an "approve payment" action will be triggered, using as it's amount the value "RA". Cases where the validation amount and the amount found to be void are equal (column 205) or where the amount found to be void is greater than the validation amount (column 215) are considered unreachable, as indicated by the "/" notation in the table. (That is, the current payment amount or "CPA" for a void payment should be zero, and therefore the validation amount will always be greater; this case is represented by column 210). Thus, assuming that the approve payment action in column 210 completes successfully, the payment's current state is changed to "payment approved".

Row 240 represents a current payment state, when performing the validation processing, of "payment approval has expired". In all cases, a modify payment approval action is triggered, using as its amount the amount ("RA") to be validated for this request. Upon successful completion of this action, the payment's current state is changed to "payment approved".

The "payment is pending" state is represented by row 245. This state may result because the authorization process was attempted when the credit card processing system was unavailable. In all cases, this policy specifies that the caller should be informed that the validation phase needs to be retried again later. Retry actions may then be carried out, whereby validation processing is repeated (and the underlying generic payment system may reset the payment state during this processing). A failure condition may be generated as an alternative to the retry actions, or after retry attempts have failed. The retry process may be performed in an automated manner, or may be under control of a person.

Finally, row 250 represents the "null" state. Since no payment object exists, the requested amount will always be greater than the current payment amount (which will have been initialized to a zero or null value). Therefore, column 210 applies. A new payment object is created by triggering the "create payment" action, and the "approve payment" action is then triggered. If this approve payment action completes successfully, the payment's current state is changed to "payment approved".

Once the merchant's e-commerce software determines that the customer's order, or some part thereof, is ready for shipment, it generates a release to fulfillment event notification. The logic for handling the release to fulfillment event (see the description of Block 930 of FIG. 9, below) applies the payment reservation policy (i.e., the payment reservation phase of the policy) selected by the merchant. For credit card payments when the policy in FIGS. 2-4 is active, this event notification is processed as specified by table 300 of FIG. 3, which represents the reservation phase. By comparing table 300 to table 200 of FIG. 2, it can be seen that the entry states and relationships between the requested amount and current payment amount are handled in an identical manner to that which has been described for the validation phase.

Returning again to the ACH transaction policy example, table 600 of FIG. 6 specifies how the reservation phase processing is to be carried out. If payment has already been approved (row 620) in the requested amount (column 605), then a "deposit payment" action is invoked for this amount, after which the current payment state transitions to "payment deposited". (See the desired state at 660.) However, if the amount already approved is different from the amount being released for shipment (columns 610 and 615), then a modify payment approval action is triggered for the requested amount, followed by a "deposit payment" action for this amount. Note that this processing is identical to the reservation phase processing for credit card payments specified in row 320 of table 300, except for the addition of the deposit payment action (and the different state transition that results from successful completion thereof).

If payment was previously declined (row 625), then an "approve payment" action is triggered (columns 605, 610, and 615) for the requested amount, followed by a "deposit payment" action for this amount. The current payment state then transitions to "payment deposited".

If payment for the requested amount has already been deposited, as represented by the intersection of row 630 and column 605, then the policy specifies that no further payment processing is required at this point, and the payment state remains set to "payment deposited". If payment has been deposited, but the amount is less than the amount of goods being released for shipment (column 610), then a new payment object is created by triggering the "create payment" action. The amount used for this payment object is the difference between the amount to be released and the already-deposited amount, shown in table 600 as "RA-CPA". An "approve payment" action for this amount is then triggered, followed by a "deposit payment" action for this same amount. Assuming these actions complete successfully, the payment's current state will be changed to "payment deposited". If the amount being released is less than the amount that has already been deposited (column 615), then no payment action is possible since, for this example policy, the theoretical ACH payment system does not allow transactions to be reversed or refunds to be issued. (Preferably, the payment is marked in some way to allow a human to find the payment and initiate refunds for these unusual cases. Alternatively, an automated refund processing mechanism might be used.)

The ACH transaction processing for a payment in the "payment void" state, represented by row 635, has 2 unreachable states as indicated by columns 605 and 615. Refer to the discussion of row 235, above, which applies equally to these unreachable states. When the requested amount is greater than the amount represented by the voided payment, then column 610 applies and an "approve payment" action and a "deposit payment" action are triggered for the requested amount.

The payment approval has expired state (row 640) does not apply (and is therefore unreachable) for ACH transactions.

If the current payment is in "payment is pending" state (row 645), then in all cases, this policy specifies that the caller should be informed that the reservation process needs to be retried again later.

Finally, row 650 represents the "null" state. Since no payment object exists, the requested amount will always be greater than the current payment amount. Therefore, column 610 applies. A new payment object is created by triggering the "create payment" action, and the "approve payment" and "deposit payment" actions are then triggered, in sequence, for the amount to be released.

A fulfillment event notification is generated by the merchant's e-commerce software when it determines that goods have been shipped. The logic for handling the fulfillment event (see the description of Block 1030 of FIG. 10, below) applies the payment finalization policy (that is, the transitions specified in the finalization phase for the policy) selected by the merchant. Returning again to the example credit card policy, table 400 of FIG. 4 represents the finalization phase for this credit card policy. By comparing table 400 to table 300 of FIG. 3, it can be seen that the entry states and relationships between the requested amount and current payment amount are handled in an identical manner to that which has been described for the reservation phase, except that the specified payment actions during the finalization phrase are followed by triggering the "deposit payment" action. That is, because the goods have now been shipped, it is appropriate to deposit the funds for those goods into the merchant's account. (Typically, this will be carried out by generating a notification to the credit card company to charge the funds to the customer and credit them to the merchant.) This processing also applies to the cell represented by the intersection of row 420 and column 405, which specifies the processing to be carried out when a payment for the correct amount had already been approved.

Table 700 of FIG. 7 specifies how the finalization phase processing is to be carried out for the ACH transaction policy example. In the example, the processing is identical to that of the reservation phase; see the description of table 600 of FIG. 6. (According to this policy for ACH transactions, funds are to be deposited as soon as allowed, which in this case is before goods are shipped. After the goods are shipped, the actions carried out in the finalization phase serve as a final check that funds were really deposited, and perhaps may have been adjusted for changed amounts.) Following successful completion of the actions in this table, the payment state for the current payment is set to "payment deposited".

Figure 8:
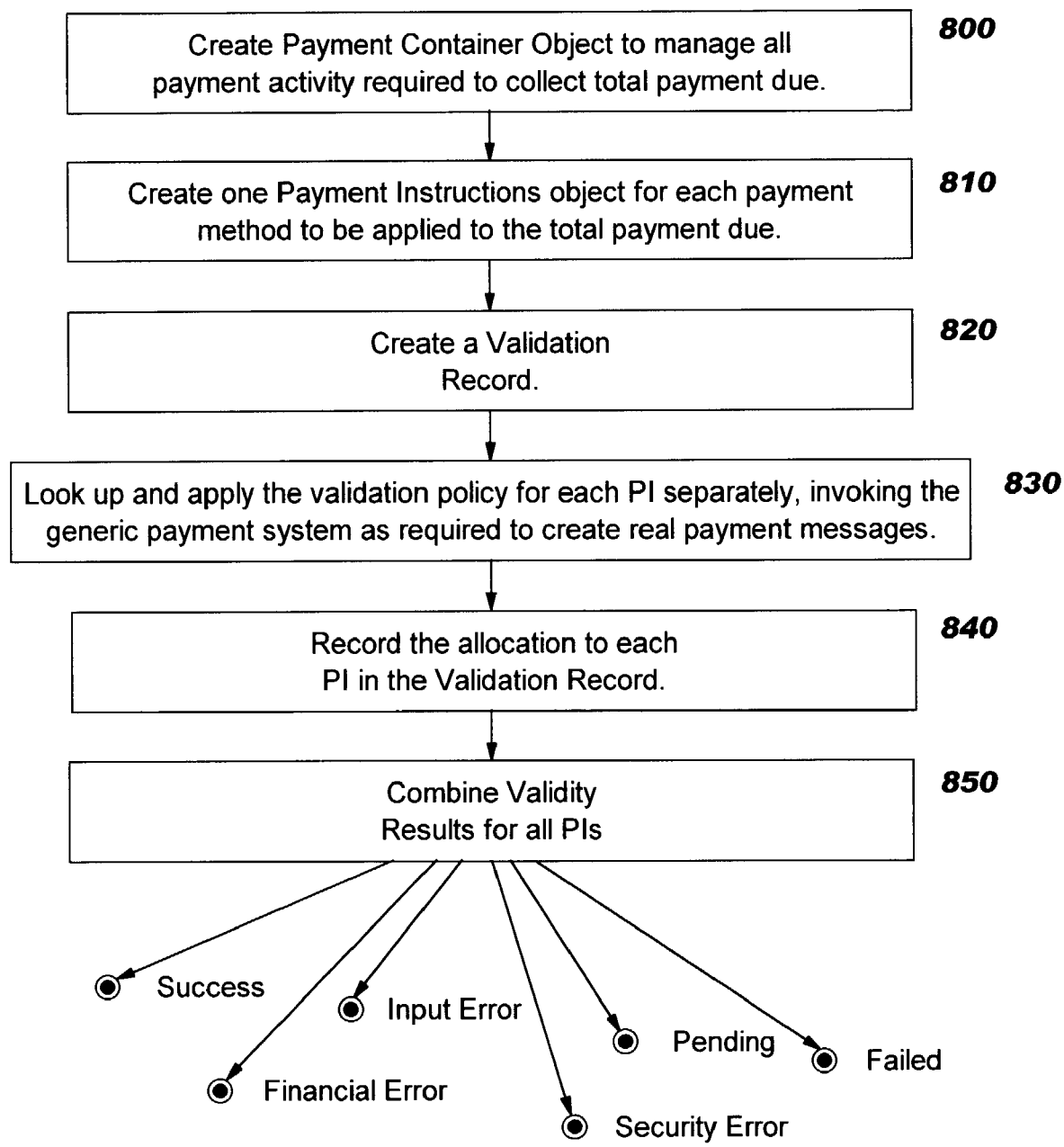
FIGS. 8-10 provide flow charts which set forth logic that may be used when implementing preferred embodiments of the present invention.
Figure 9:
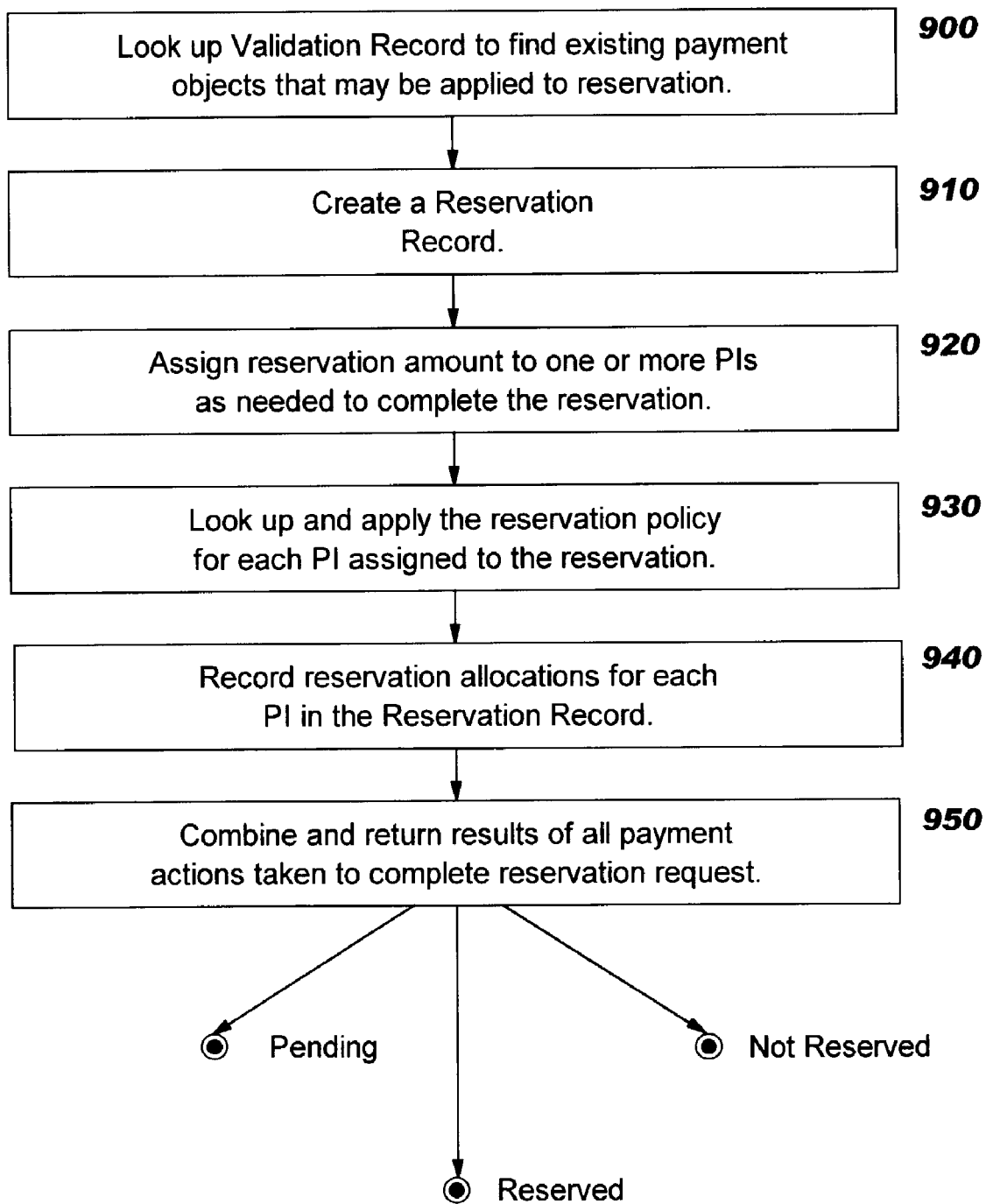
Figure 10:
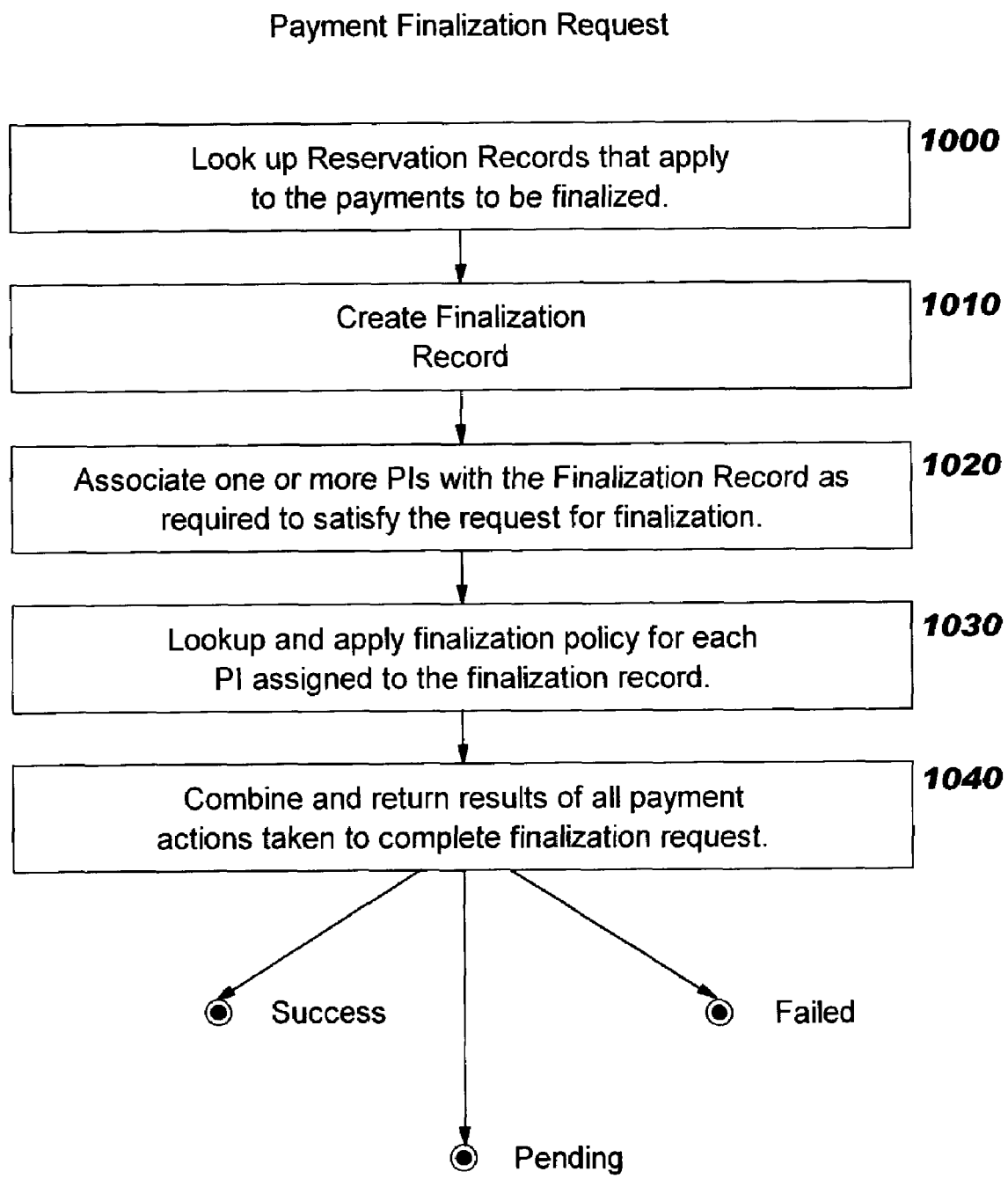

Flow charts depicting logic that may be used when implementing preferred embodiments of the present invention are provided in FIGS. 8-10. These flow charts represent logic that is invoked responsive to receiving the order capture, release to fulfillment, and fulfillment event notifications, respectively.

The logic in FIG. 8 serves to record payment information for a particular order, and to create and process a payment validation request for that order. In preferred embodiments, Block 800 creates a new payment container object. This object will be used to manage all of the payment activity that is required to collect the total payment for this order. For example, the object will be used to track the current state of the payment(s); the amount of payment approvals and deposits; and how much of the order has been released for shipment.

As discussed earlier, more than one payment instrument may be used for a single order. In addition, more than one payment may be made using each payment instrument. For example, a customer might have a gift certificate that she wishes to use, but the amount of the certificate is less than the total payment required for the order. In that case, she might choose to use a credit card to pay the remaining balance (and the policy for gift certificates must be designed to ensure that the policy-driven payment processing will result in applying the gift certificate to the order first, before applying the credit card), and might use this credit card more than once when making the remaining payments. In preferred embodiments, the set of payment instruments to be used for a particular order is preferably indicated as a parameter on the order capture event notification. Block 810 creates an object, referred to herein as a "payment instructions" object, for each payment method that will be used for this order. In preferred embodiments, these payment instructions objects record how much of the payment for a particular order is to be made using the corresponding payment instrument, along with zero or more data values that are specific to that type of payment instrument. (For example, a payment instructions object for a credit card payment records information such as the credit card number, expiration date, account holder's name and billing address, etc. A payment instructions object for an ACH transaction records information such as the routing number of the transmitting financial institution.) Typically, the customer indicates how much of the total order payment is to be made using each of the payment instruments; alternatively, this may be calculated programmatically (e.g., upon determining the order in which each instrument is to be considered, and the payment amount available from each instrument). The payment container object created in Block 800 maintains an awareness of the payment instructions objects created in Block 810 (for example, by storing an array of pointers to them).

A "validation record" object is created and initialized in Block 820. In preferred embodiments, this validation record object tracks a payment's progress through the validation phase and is used for recording the result of attempting to validate each of the payment instructions.

Block 830 then looks up and applies the validation policy that has been configured (i.e., selected) by the merchant for each of the payment instructions that will be used for this order. A generic payment system is invoked during this processing, as required, to create actual payment messages. For example, payment messages may be exchanged with an acquiring bank to process authorization and capture messages for credit card transactions. (As stated earlier with reference to FIG. 1, details of the generic payment system are beyond the scope of the present invention.) In an optional enhancement, an implementation of the present invention may provide for overriding the selection of policy for particular payments (e.g., for a particular order or other payment processing unit.) This overriding may consider one or more factors such as: the amount of the payment transaction (and/or of the order); an identification of the customer on whose behalf the payment is being made (for example, whether this customer belongs to a "preferred customer" group, or as another example, whether this customer's payment warrants different treatment for other reasons); and so forth. It will be obvious to one of ordinary skill in the art how the logic of the flow charts in FIGS. 8-10 can be adapted to support this optional enhancement. (It should be noted that, according to preferred embodiments, the overriding must occur for the first business event, so that the newly-selected policy then applies for all business events pertaining to that payment. Policies are not changed once the first business event for a payment has begun to be processed.)

In an alternative embodiment, an implementation of the present invention may be adapted for allowing run-time selection of one or more policies to be used, rather than configuring the entire set of policies prior to operation of the payment-processing code. (As one example, an interface might be provided whereby a systems administrator or other person would be presented with a request to choose an applicable policy, and means for responding to this request, when an exception condition is encountered.)

As each policy is applied, the validation record object is revised (Block 840) to record the corresponding allocation information. In preferred embodiments, this allocation information comprises a record of which particular payment objects were involved in the validation, and the amounts allocated to each for validation. For example, if the order was paid for by gift certificate and credit card, and both policies required validation actions, then the validation record would have an entry which points to a payment object for the gift certificate and another entry which points to a payment object for the credit card payment. (While the flow chart shows Block 830 as completing before Block 840 begins, is it to be understood that in an actual implementation, the processing of these two blocks is preferably interleaved, such that each payment instruction is validated and the result of that validation is recorded before moving on to the next payment instruction.)

Finally, Block 850 evaluates the validation results for all of the payment instructions to be used for this order, yielding the validation status of the order as a whole. If and only if the validation for all payment methods was successful, then the validation status of the order is set to successful. If an error of some type is generated when validating one or more of the payment instructions, then the validation status of the order is set to that error status (or, when multiple errors have been generated, the validation status of the order is preferably set to the most severe error status). By way of example, FIG. 8 indicates that potential validation status values for an order are "success", "financial error", "input error", "security error", "pending", and "failed". The validation status is then returned to the invoking logic.

Note that the validation status values shown in FIG. 8 are related to, but do not directly correspond to, the payment states used in the policies. One of the purposes of the policy engine is to interpret the results of payment actions that are carried out in the generic payment system and translate those results to a smaller set of return values that divides up the possible results according to actions required by the merchant system.

The logic in FIG. 9 handles a payment reservation request for all or part of the payment for an order, upon receiving a release to fulfillment event notification. This process begins, in preferred embodiments, by looking up (Block 900) this order's validation record object (created during the processing of FIG. 8) to find any existing payment objects that may be applied to this reservation request. Block 910 then creates a new "reservation record" object, and in Block 920, the amount of this reservation (passed as an input parameter to the processing of FIG. 9, in preferred embodiments) is assigned to one or more payment instructions objects, in order to complete the reservation. As stated above with reference to Block 810, these payment instructions objects record, inter alia, how much of the payment for a particular order is to be made using the corresponding payment instruction. Thus, the processing of Block 920 comprises comparing those recorded amounts to the amount of this payment reservation request. Typically, when multiple payment instructions are to be used for a single order, it will be necessary to determine the order in which those instructions should be applied. This ordering information is preferably determined by evaluating the applicable policies (but alternatively may be specified by the customer, for example as a configuration option, or perhaps coded into an implementation of the present invention). In the former case, the processing of Block 920 is preferably interleaved with the processing of Blocks 930 and 940.

The processing in Blocks 930 and 940 comprises looking up and applying the reservation policy (see, e.g., tables 300 of FIG. 3 and 600 of FIG. 6), for each payment instructions object that is to be used for this payment reservation, and then recording the reservation allocations in the reservation record object created in Block 910. In preferred embodiments, the recorded reservation allocations comprise a dollar amount (in any currency) and a payment object identifier. Note that the amount recorded does not have to be the total amount of the particular payment object, although in most policies (and in the simplest implementation) this will be the case: it is possible to create more complicated policies that will essentially "record a lien" against a portion of an existing object. For example, suppose $300 was validated by doing a payment approval, followed by a reservation request for only $100 (with a desired state of "payment approved"). The example policies described herein call for the $300 amount to be changed into $100. Alternatively, a more complex policy might call for $100 of the $300 to be claimed, without any actual payment actions being invoked. Then, if a request to reserve $200 is subsequently received, the remaining $200 will be claimed. (This type of advanced policy and function allows a merchant to create the minimum number of protocol messages to back-end systems, which can reduce the merchant's overall fees.)

Block 950 then evaluates the results of the payment actions that have been taken (as indicated by the applicable policies) during the process of performing this reservation request, and combines those results to determine the reservation status for the payment instructions objects for which a payment is being reserved on this invocation. If the reservation status for all the pertinent payment instructions objects is successful (i.e., indicating that the payment has been reserved), then the reservation status is set to a value such as "reserved". If one or more pending or failure conditions were encountered, however, then the reservation status is set to a value such as "pending" or "not reserved", respectively. This result is then returned to the invoking software.

FIG. 10 depicts logic that may be used to handle a payment finalization request for one or more payments for an order, upon receiving a fulfillment event notification. (If the entire order is shipped at one time, then the logic of FIG. 10 is typically invoked a single time, whereas when an order ships in multiple releases, then the logic of FIG. 10 is typically invoked once for each release.) In preferred embodiments, the finalization request processing begins by looking up (Block 1000) the reservation record objects that apply to the payment(s) being finalized (which, in preferred embodiments, are identified using input parameters). A finalization record object is created in Block 1010, and in Block 1020, each of the payment instructions objects that corresponds to this finalization request are then associated with that finalization record object (for example, by storing an array of pointers to the payment instructions objects).

In Block 1030, the finalization policy associated with each of the payment instructions objects is looked up and applied. (See, e.g., tables 400 of FIG. 4 and 700 of FIG. 7).

The results of the payment actions that have been taken when applying the finalization policies are then combined (Block 1040), and the combined result represents the finalization status of the payment instructions objects that correspond to this finalized payment. If the finalization status for all of these payment instructions objects is successful (i.e., indicating that the payment has been finalized), then the finalization status to be returned for this request is a value such as "success". If one or more pending or failure conditions were encountered, however, then the finalization status to be returned is a value such as "pending" or "failed", respectively. The processing of FIG. 10 then ends.

Multiple calls can be made for the same business event when processing a particular order, for example as multiple releases are prepared for shipment and then shipped. According to preferred embodiments, the merchant's e-commerce software is not required to manage the details of which payment transactions will be applied to which releases to fulfillment, nor to the finalization, and so forth. Instead, these details are handled by the policy engine, which correlates releases to payments via the reservation and finalization records. The merchant's software simply invokes the business events at the proper time.

As has been demonstrated, the present invention discloses advantageous techniques for supporting payment processing of multiple payment methods for e-commerce transactions. Configured payment policies are defined, and a merchant's e-commerce software invokes the logic of a particular policy by triggering event notifications based on the business state of a transaction. This approach enables the merchant's software developers to concentrate their efforts on the merchant's core business needs, and makes it easier to maintain the merchant's e-commerce software. Instead of accommodating details of various payment instructions within the merchant's e-commerce software, the merchant just selects the policies that will carry out the desired processing.

In the prior art, payment software solutions have been developed which can be leveraged as callable utilities from merchant e-commerce applications. One prior art payment software solution is the WebSphere® Payment Manager product from International Business Machines Corporation ("IBM®"). This payment software product will be referred to hereinafter as the "payment management component", and is representative of the previously-described payment engine and generic payment system. ("WebSphere" and "IBM" are registered trademarks of International Business Machines Corporation in the United States, other countries, or both.)

The payment management component provides an API which has a number of payment-related commands that can be invoked by merchant e-commerce applications. The payment management component adheres to an architecture referred to as the "WebSphere Commerce Payments Framework", which also defines requirements for pluggable software modules called "cassettes". A cassette contains software to support a particular payment method. A merchant using the payment management component then "plugs in" a cassette for each type of payment method to be offered to the merchant's customers. For example, one cassette might support a credit card processor, while another cassette supports a different credit card processor and yet another cassette supports stored-value cards. (Refer to "IBM WebSphere Commerce Payments Programmer's Guide and Reference" and "IBM WebSphere Commerce Payments for Multiplatforms: Cassette Kit Programmer's Guide", both of which are available from any IBM branch location as well as on the Internet at http://www.ibm.com, for detailed information about the payment architecture as well as the payment management component and the cassettes it uses.)

The existing payment management component product shields merchant e-commerce applications from a great deal of payment processing detail. It uses a generic API where merchant code calls particular command-processing logic within a selected payment cassette. The existing payment management component product does not provide a business event driven-model and does not use configured policy as disclosed herein.

While the payment management component does generate "event notifications", these are notifications sent using HyperText Transfer Protocol ("HTTP") POST messages to a Uniform Resource Locator ("URL") of an external merchant software process (i.e, a process that is external to the payment manager component). For example, when a buyer's payment instruction is approved, an event notification may be sent to a product distribution application to notify that application to release the ordered goods for shipment. The existing payment management component product leverages profiles that specify how commands and their parameters should be processed for particular cassettes; that is, a profile maps command parameter names to the appropriate source of values for those parameters, on a per-cassette basis. These profiles are not to be confused with the policies used by the present invention.

The existing payment management component contains support for a single payment method (i.e., payment instruction) per order (including multiple payments made against this payment method), but does not contain support for multiple payment methods per order. In contrast, an implementation of the present invention easily and flexibly supports multiple payment methods per order.

Use of the present invention also simplifies the process of allowing merchant e-commerce software to interact with new payment-processing cassettes of the type used by the payment management component. That is, in the prior art when a new payment cassette is introduced, changes to the merchant's code may be necessary or desirable in order to interact with the protocol embodied in the cassette. The present invention removes this dependency. (The techniques disclosed herein are especially advantageous when the merchant e-commerce software is itself a commercially-marketed product: in that case, the merchants do not typically have access to the source code for the e-commerce software, and thus cannot make changes. Instead, in the prior art the merchant must either obtain a new version of the product, or forego use of the new payment protocols.) Preferred embodiments of the present invention may be implemented in the IBM WebSphere Commerce Payments Framework environment. (Alternatively, the novel concepts disclosed herein may be implemented in other systems or other environments without deviating from the scope of the present invention.) When implemented within the WebSphere Commerce Payments Framework, an embodiment of the present invention preferably resides between the merchant e-commerce software and the WebSphere Commerce Payments Framework's payment engine.

Figure 11:
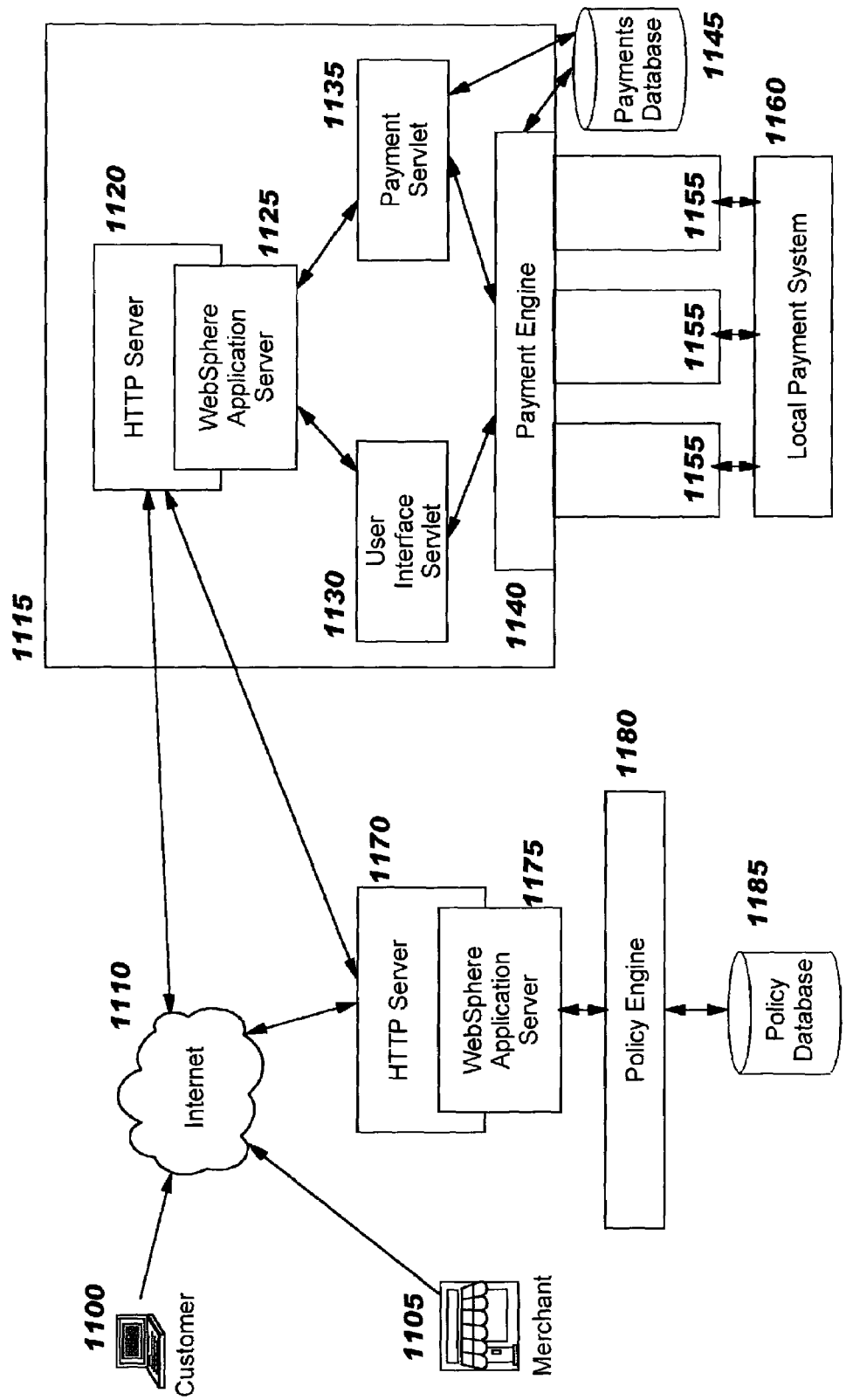
FIG. 11 illustrates an electronic commerce environment of the prior art, in which preferred embodiments of the present invention may be deployed, as discussed herein.

For an illustration of this configuration, see FIG. 11. As shown therein, a customer 1100 interacts, through a network such as the Internet 1110, with an embodiment of the present invention, shown as having an HTTP server 1170 and a WebSphere application server 1175 for handling HTTP requests and responses. Policy engine 1180 interacts with a policy database 1185, and upon determining actions to be carried out according to a policy, sends messages through application server 1175 and HTTP server 1170 to the HTTP server 1120 of the payment management component 1115 to pay for products from a merchant 1105. (Order-related messages may also pass directly from Internet 1110 to the payment manager component's HTTP server 1120.) The payment management component 1115 also has an HTTP server 1120 and a WebSphere application server 1125 for handling HTTP requests and responses. The application server 1125 forwards requests to a user interface servlet 1130 and a payment servlet 1135 (which is also referred to as the "cashier" software for the payment management component). Payment transactions sent to the payment servlet 1135 may be forwarded to the payment engine 1140, or handled directly by the payment servlet. A payments database 1145 may be accessed and updated while processing payment transactions. One or more payment cassettes 1155, which interact with a remote payment system 1160 (such as a credit card processing system), may be invoked to carry out the actions which the policy engine 1180 requests from the payment management component 1115 based on the actions specified in the policies.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or flow diagrams of methods, apparatus (systems), and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

What is claimed:

1. A computer-implemented method of processing payments, comprising:
   receiving, at a policy engine from an executing application, a business event notification signifying that business processing of a transaction has reached a particular business stage;
   programmatically determining, by the policy engine responsive to the receiving, which of a plurality of payment-processing policies was previously selected, by a merchant for which the business processing of the transaction is processed by the executing application, to specify how to process a payment when using a payment method that is associated with this transaction, wherein:
      each of the payment-processing policies comprises a state transition specification for each of at least three phases of payment processing; and
      the state transition specifications for each of the phases specify:
         a desired state toward which the payment processing is progressing in that phase;
         a plurality of starting states for interim payment processing in that phase;
         for each of the starting states, at least two conditions comparing an existing payment amount already processed for the transaction to an amount of payment currently being processed for the transaction in this phase; and
         for each of the specified conditions, any actions that are to be carried out, when that starting state is applicable for the transaction and that condition is met, for progressing the payment processing toward the desired state;
   programmatically determining, by the policy engine, which of the at least three phases of payment processing is applicable to the received business event notification; and
   using, by the policy engine, the state transition specification for the programmatically-determined applicable phase in the programmatically-determined policy to process the payment using the payment method that is associated with this transaction, further comprising carrying out each of the any actions that are specified in a currently-applicable one of the starting states for interim payment processing in this programmatically-determined applicable phase in the programmatically-determined policy and for which the specified condition is met, wherein:
      the currently-applicable one of the starting states for interim payment processing comprises that one of the starting states matching a current state of the payment processing for the transaction;
      a plurality of the actions specified in each of the state transition specifications change the current state of the payment processing for the transaction; and
      at least one of the actions specified in each of the state transition specifications changes the current state of the payment processing for the transaction to the desired state for that state transition specification.

2. The computer-implemented method according to claim 1, wherein:
   more than one payment method is associated with the transaction;
   programmatically determining which of a plurality of payment-processing policies was previously selected is performed for each of the associated payment methods; and
   using the state transition specification is performed for each of the associated payment methods.

3. The computer-implemented method according to claim 1, wherein the previously selected policy was selected, by the merchant, from a plurality of payment-processing policies that each specify how to process a payment when using the payment method.

4. A computer-implemented method for providing a policy-driven payment processing system, comprising:
   providing a plurality of payment-processing policies for each of a plurality of payment methods, wherein:
      each of the policies specifies how to process payments for a selected one of the payment method methods when using this policy;
      each of the policies comprises a state transition specification for each of at least three phases of payment processing; and
      the state transition specifications for each of the phases specify:
         a desired state toward which the payment processing is progressing in that phase;
         a plurality of starting states for interim payment processing in that phase;
         for each of the starting states, at least two conditions comparing an existing payment amount already processed for a transaction to an amount of payment currently being processed for the transaction in this phase; and
         for each of the specified conditions, any actions that are to be carried out, when that starting state is applicable for the transaction and that condition is met, for progressing the payment processing toward the desired state;
   enabling a merchant to select, for each of the payment methods, a particular one of the provided policies for processing payments when using that payment method;
   receiving, at a policy engine from an executing application, business event notifications, each of the business event notifications signifying that business processing of the transaction has reached a particular business stage;
   programmatically determining, by the policy engine, the policy selected by the merchant for processing the payments when using a selected one of the payment methods that is associated with the transaction;
   programmatically determining, by the policy engine, which of the at least three phases of payment processing is applicable to each of the received business event notifications; and
   applying the programmatically-determined policy to process the payment for the transaction, for each of the received business event notifications, thereby moving the payment for the transaction toward completion, by initiating processing of each of the any actions that are specified in a currently-applicable one of the starting states for interim payment processing, in the state transition specification for the programmatically-determined applicable phase in the programmatically-determined policy, and for which the specified condition is met, wherein:
      the currently-applicable one of the starting states for interim payment processing comprises that one of the starting states matching a current state of the payment processing for the transaction;

a plurality of the actions specified in each of the state transition specifications change the current state of the payment processing for the transaction; and at least one of the actions specified in each of the state transition specifications changes the current state of the payment processing for the transaction to the desired state for that state transition specification.

* * * * *